United States Patent [19]

Kondoh et al.

[11] Patent Number: 4,888,721

[45] Date of Patent: Dec. 19, 1989

[54] ELEMENTARY FUNCTION ARITHMETIC UNIT

[75] Inventors: Eiki Kondoh; Shigeki Morinaga, both of Hitachi; Takao Yaginuma, Hitachiohta; Takeshi Asai, Hitachi, all of Japan

[73] Assignees: Hitachi, Ltd., Tokyo, Japan; Hitachi Engineering Co., Ltd., Hitachi, Japan

[21] Appl. No.: 94,752

[22] Filed: Sep. 9, 1987

[30] Foreign Application Priority Data

Sep. 9, 1986 [JP] Japan ............................... 61-212318

[51] Int. Cl.$^4$ ............................................... G06F 7/38
[52] U.S. Cl. ..................................................... 364/736
[58] Field of Search .................................. 364/756, 730, 364/754, 748

[56] References Cited

U.S. PATENT DOCUMENTS 4,231,102 10/1980 Barr et al. .......................... 364/726
4,338,675 7/1982 Palmer et al. ....................... 364/748
4,484,259 11/1984 Palmer et al. ....................... 364/754

OTHER PUBLICATIONS

Volder, "The Cordic Trigonometric Computing Technique", IRE Trans. on Elect. Computers, vol. EC-B, Sep. 1959, pp. 330–334.

Despain, "Fourier Transform Computers Using Cordic Iterations", IEEE Trans. on Computers, vol. C-23, No. 10, Oct. 1974, pp. 993–1001.

Primary Examiner—Gary V. Harkcom
Assistant Examiner—Tan V. Mai
Attorney, Agent, or Firm—Antonelli, Terry & Wands

[57] ABSTRACT

A function arithmetic unit which performs elementary operations at high speeds and which enables required memory capacity to be reduced. The function arithmetic unit includes a constant memory which stores a constant that corresponds to the number of successive iterative operations; a controller which causes addition or subtraction in the successive iterative operations; and arithmetic units which receive, as initial values, an argument of an elementary function value to be found and two constants determined depending upon the elementary functions to be found, and which subject these initial values to n iterative operations to produce elementary function values. A further arithmetic unit subjects the elementary function values to multiplication, addition, subtraction, or division, or a combination thereof, thereby to produce the thus obtained value.

3 Claims, 8 Drawing Sheets

ELEMENTARY FUNCTION ARITHMETIC UNIT

BACKGROUND OF THE INVENTION

The present invention relates to an elementary function arithmetic unit, and particularly to a binary element function arithmetic unit adapted for finding at high speeds the values of elementary functions while maintaining good precision.

The Cordic method, which is one of the conventional methods of finding elementary functions, is equivalent to an algorithm for finding elementary functions by successively rotating the coordinate vectors, as described in "A Unified Algorithm for Elementary Functions," Vol. 38, 1971, SJCC, pp. 397-385.

The successive iterative equation (1.1) therefor is given as follows:

$$\left.\begin{array}{l} X_{i+1} = X_i + m \cdot p \cdot Y_i \cdot \delta_i \\ Y_{i+1} = Y_i - p \cdot X_i \cdot \delta_i \\ Z_{i+1} = Z_i + p \cdot \alpha_i \left( \alpha_i = \frac{1}{\sqrt{m}} \cdot \tan^{-1}(\sqrt{m} \cdot \delta_i) \right) \end{array}\right\} \quad (1.1)$$

where $X_i$ and $Y_i$ denote values along the X-axis and Y-axis of a vector on an XY coordinate system, $Z_i$ denotes the cumulative rotational angle ($\alpha_i$) of the vector by the successive iteration of the vector, and $\delta_i$ denotes a given variation.

Here, m denotes a parameter which assumes the two values of $m=1$, $m=-1$, depending upon whether the elementary function to be found is a trigonometric function (inclusive of inverse trigonometric functions) or a hyperbolic function (inclusive of inverse hyperbolic functions). Further, P denotes the polarity for converging $Y_i$ or $Z_i$ into zero, which assumes two values, i.e., $P = \pm 1$, in each iterative step.

Here, if the polarity P is so controlled that $Z_{i+1}$ becomes zero, and if the value of $X_{i+1}$, $Y_{i+1}$ and $Z_{i+1}$ obtained by n iterations are denoted by $X_n$, $Y_n$ and $Z_n$, then there are obtained the results of the following equation (1.2), $$\left.\begin{array}{l} X_n = K_1 \{ X_o \cos(\sqrt{m} Z_o) - Y_o \sqrt{m} \sin(\sqrt{m} Z_o) \} \\ Y_n = K_1 \left\{ Y_o \cos(\sqrt{m} Z_o) + X_o \frac{1}{\sqrt{m}} \sin(\sqrt{m} Z_o) \right\} \\ Z_n = 0 \end{array}\right\} \quad (1.2)$$

where $K_1$ denotes a constant determined by the number n of iterations and $\delta_i$, and is given by $$K_1 = \sum_{i=0}^{n} (\sqrt{1 + m \delta_i^2}).$$

Next, the polarity P is so controlled that $Y_{i+1}$ becomes zero, and the iteration is effected n times to obtain the results as given by the following equation (1.3), $$\left.\begin{array}{l} X_n = K_1 \sqrt{X_o^2 + m Y_o^2} \\ Y_n = 0 \\ Z_n = Z_o + \alpha \alpha = \frac{1}{\sqrt{m}} \tan^{-1}\left( \sqrt{m} \frac{Y_o}{X_o} \right) \end{array}\right\} \quad (1.3)$$

As represented by the equations (1.2) and (1.3), therefore, if $X_0$, $Y_0$ and $Z_0$ which are initial values of $X_i$, $Y_i$ and $Z_i$, are suitably selected (e.g., when cos ($\sqrt{m}$ w) is to be found, the values are so selected that $X_0 = 1/K_1$, $Y_0 = 0$, $Z_0 = w$ in the equation (1.2)), the value can be found in any one of $X_n$, $Y_n$ or $Z_n$. The foregoing describes the fundamental algorithm of the Cordic method.

In constituting hardware with a binary arithmetic unit according to the Cordic method, $\delta_i = 2^{-j}$ (j: positive integer) is quoted, and the hardware is realized by barrel-shifting the multiplications $Y_i \cdot \delta_i$ and $X_i \cdot \delta_i$ in the step of successively iterating equation (1.1). Here, the rotational angle ($\alpha_i$) utilizes the data stored in the memory (ROM) for each iteration. Therefore, the elementary function arithmetic unit had heretofore been constituted by a register, adder-subtracter, barrel shifter and memory.

FIG. 2 illustrates a conventional elementary function arithmetic unit which gives three initial values ($a_0$, $b_0$, $c_0$). The initial values $a_0$ and $b_0$ may be input in a form opposite to those shown in FIG. 2; i.e., $b_0$ may be input to the arithmetic unit 100 and $a_0$ may be input to the arithmetic unit 101. One of the three initial values is an argument (in the case of cos (w), the argument stands for w) of an elementary function to be found, and the other two initial values are constants that should be determined depending upon the elementary functions to be found. The three initial values are subjected to the successive iterative operation n times by the arithmetic units 100, 101 and 102 in compliance with relationships $a_{i+1} = a_i \pm b_i \cdot \delta_i$, $b_{i+1} = b_i \pm a_i \cdot \delta_i$, and $c_{i+1} = c_i \pm cR_i$. Here, $\delta_i$ denotes a given variation. $cR_i$ denotes a constant determined depending upon the number of iterations and which is stored in advance in the memory 103.

In the step of iteration, the value $b_i$ or $c_i$ is input to a controller 104 which in response to a control signal a controls whether the i+1-th operation of the arithmetic unit be an addition or a subtraction depending upon an elementary function to be found. After n times of iteration, any one of the output $a_n$, $b_n$ or $c_n$ is selected by a multiplexer 105 that is controlled by a controller control signal b depending upon the elementary function to be found, and whereby an output $d_n$ is obtained. The output $d_n$ is equal to the output $a_n$ when the position 1 of the multiplexer 105 is selected, the output $d_n$ is equal to the output $b_n$ when the position 2 is selected, and the output $d_n$ is equal to the output $c_n$ when the position 3 is selected. The elementary function value is obtained for the output $d_n$.

When a binary elementary function arithmetic unit is constituted by the above conventional Cordic method, a function $2^{-j}$ is used for $\delta_i$ and the multiplications $X_i \cdot \delta_i$ and $Y_i \cdot \delta_i$ in the equation (1.1) are realized by a barrel shifter. Therefore, the maximum effective number of iterations is equal to the number of bits of the register. Iterations greater than this number give no meaning since the multiplication terms are all carried down relative to the adder terms of one side.

To obtain the value of an elementary function with a high precision, on the other hand, the value $Z_i$ or $Y_i$ must be sufficiently converged close to zero. To obtain maximum precision with the binary elementary function arithmetic unit based upon the Cordic method, therefore, the iterations must be done a number of times equal to the number of bits of the register. When the number of iterations is small, the value $Z_i$ or $Y_i$ does not converge sufficiently, and error is contained in the value of the elementary function that is found. Therefore, the precision is improved by increasing the number of iterations. In other words, the speed of operation for the elementary function becomes slow and, more than that, a memory having an increased capacity must be employed to store the data $\alpha_i$ of the equation (1.1) in an amount that meets the number of iterations. That is, with the conventional art, the speed of operating the elementary function and the memory capacity established a relationship in reverse proportion to the precision, and it was a serious problem to make them compatible with each other.

SUMMARY OF THE INVENTION

The object of the present invention is to provide an elementary function arithmetic unit which halves the number of iterations required, which finds the elementary functions at an increased speed, and which helps greatly reduce the memory capacity required, yet which maintains the same precision as the maximum precision obtained with the conventional Cordic method.

In the conventional Cordic method, if the value of the elementary function found for any one of $X_n$, $Y_n$ or $Z_n$ through a relatively small number n of iterations is denoted by $C_n$, if the value of the true elementary function is denoted by $T_n$ and the error by $E_n$, then the value $C_n$ is given as $C_n = T_n + E_n$.

In the Cordic method, occurrence of error $E_n$ is attributed to the value $Z_i$ or $Y_i$ not being sufficiently approximated to zero. If a deviation from zero is denoted by $\Delta e$, then the error $E_n$ can be regarded to be a function depending upon the deviation $\Delta e$. If the function thereof is denoted as $f(\Delta e)$, then the above relation is written as $C_n = T_n + f(\Delta e)$.

Therefore, $$T_n = C_n - f(\Delta e) \qquad (2.1)$$

Namely, the true value $T_n$ can be found by subtracting the error $f(\Delta e)$ that changes depending upon $\Delta e$ from the value $C_n$ that contains error. Therefore, equation (2.1) corrects the error.

The present invention therefore deals with an elementary function arithmetic unit which comprises:

a constant memory which stores a constant corresponding to the number of iterations used for the successive iterative operations;

a controller which instructs addition or subtraction in the successive iterative operations; and arithmetic units which receive, as three initial values, an argument of an elementary function to be found and two constants determined depending upon the elementary functions to be found, and which subject these initial values to n iterative operations to produce values of the elementary function;

wherein the improvement further comprises an arithmetic unit which subjects the three values obtained after n iterative operations by said arithmetic units to multiplication and addition or to subtraction or to division and addition or to subtraction, thereby to produce an output thereof.

The above-mentioned invention corrects error in compliance with the aforementioned equation (2.1). Thus, the invention so works as to cancel the errors of elementary function values containing much error that are found through a reduced number of iterative operations. This makes it possible to obtain elementary function values with good precision through a reduced number of iterative operations. Therefore, the elementary functions can be found at high speeds and the memory capacity required for the elementary function operation can be reduced, yet maintaining good precision.

Other objects and features of the present invention will become obvious from the description of embodiments mentioned below.

DETAILED DESCRIPTION OF THE EMBODIMENTS

Embodiments of the present invention will now be described.

Figure 8:
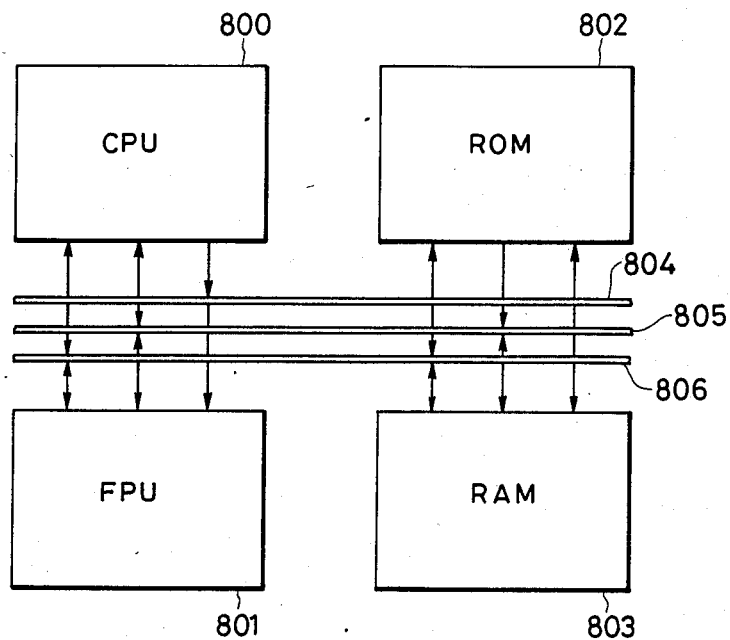
FIG. 8 is a diagram illustrating a microcomputer system which includes a coprocessor that constitutes an embodiment of the present invention.

FIG. 8 is a diagram of a microcomputer system for carrying out floating-point calculations. This system has two arithmetic circuits, i.e., a CPU (central processing unit) 800 and an FPU (floating-point processing unit) 801 to carry out the floating-point calculation. Preferably, the CPU 800 and the FPU 801 are constituted in the form of integrated circuits on separate semiconductor substrates. The CPU 800 and the FPU 801, however, may be constituted in the form of integrated circuits on the same semiconductor substrate. The CPU 800 is designed to operate on integer-type data only but is not capable of operating on data of the floating-point type. The FPU 801, on the other hand, is capable of executing arithmetic operations on data of the floating-point type and executing the elementary function operation. A ROM (read-only memory) 802 stores a program which contains macro instructions for the two arithmetic circuits, i.e., for the CPU 800 and the FPU 801. However, only the CPU 800 is capable of decoding the macro instructions. Therefore, the FPU 801 is interfaced by the protocol with the CPU 800. Here, the above FPU 801 is called a coprocessor. A RAM (random access memory) 803 stores argument data of the integer type and the floating-point type. Reference numeral 804 denotes an address bus onto which the outputs will be produced from the CPU 800. Reference numeral 805 denotes a data bus, and 806 denotes a control bus for effecting the control in relation to the interface.

Figure 9:
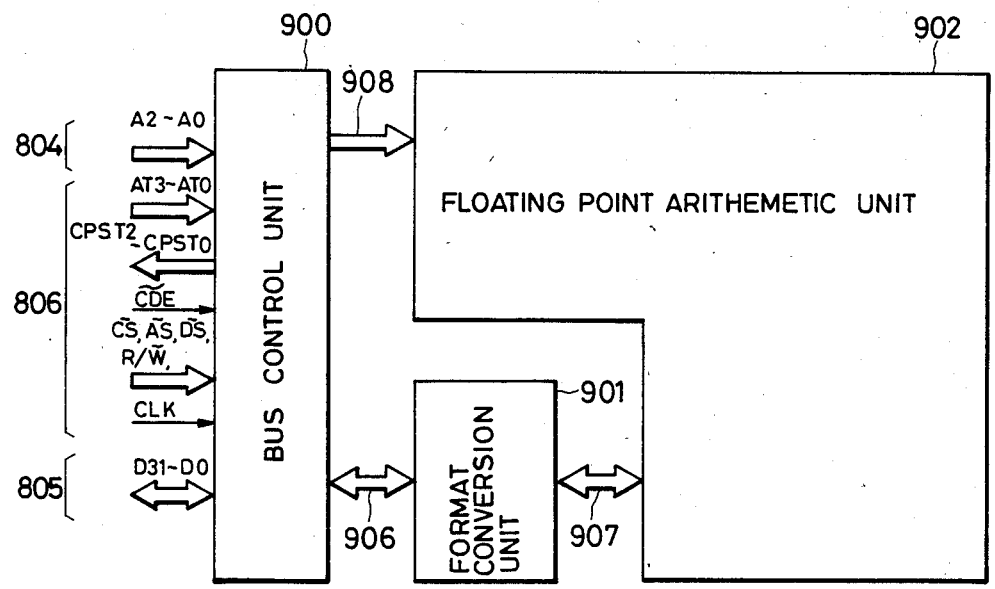
FIG. 9 is a block diagram illustrating a floating-point operation processor according to an embodiment of the present invention.
Figure 1:
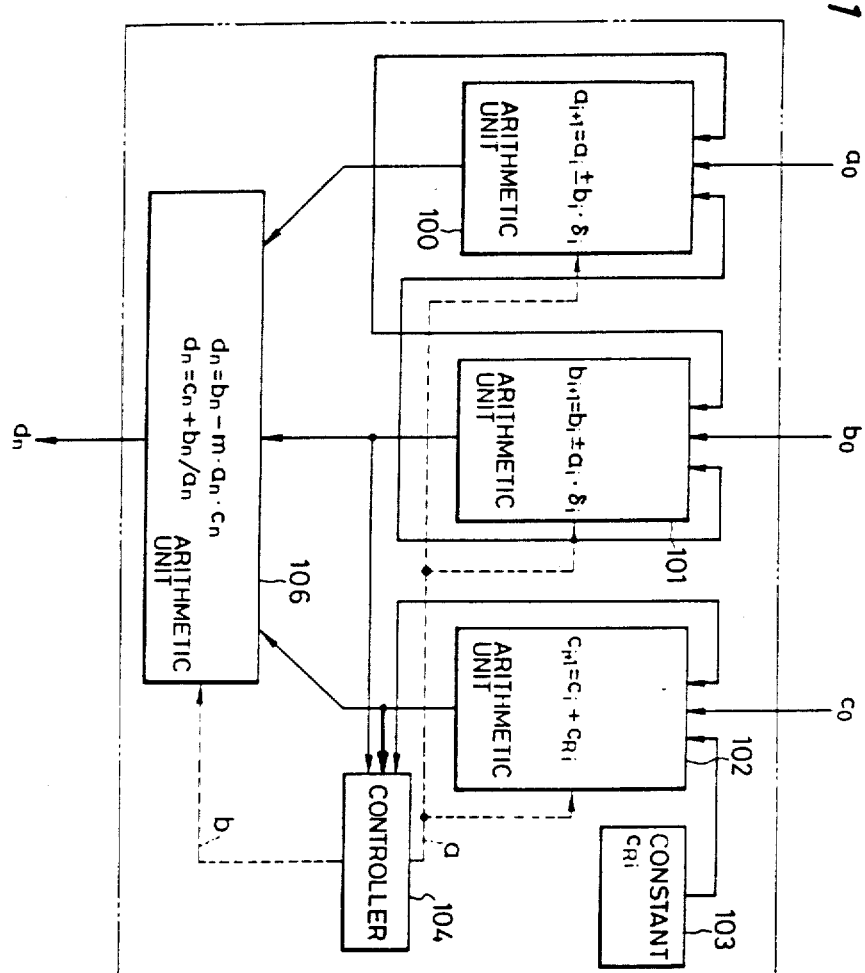
Figure 2:
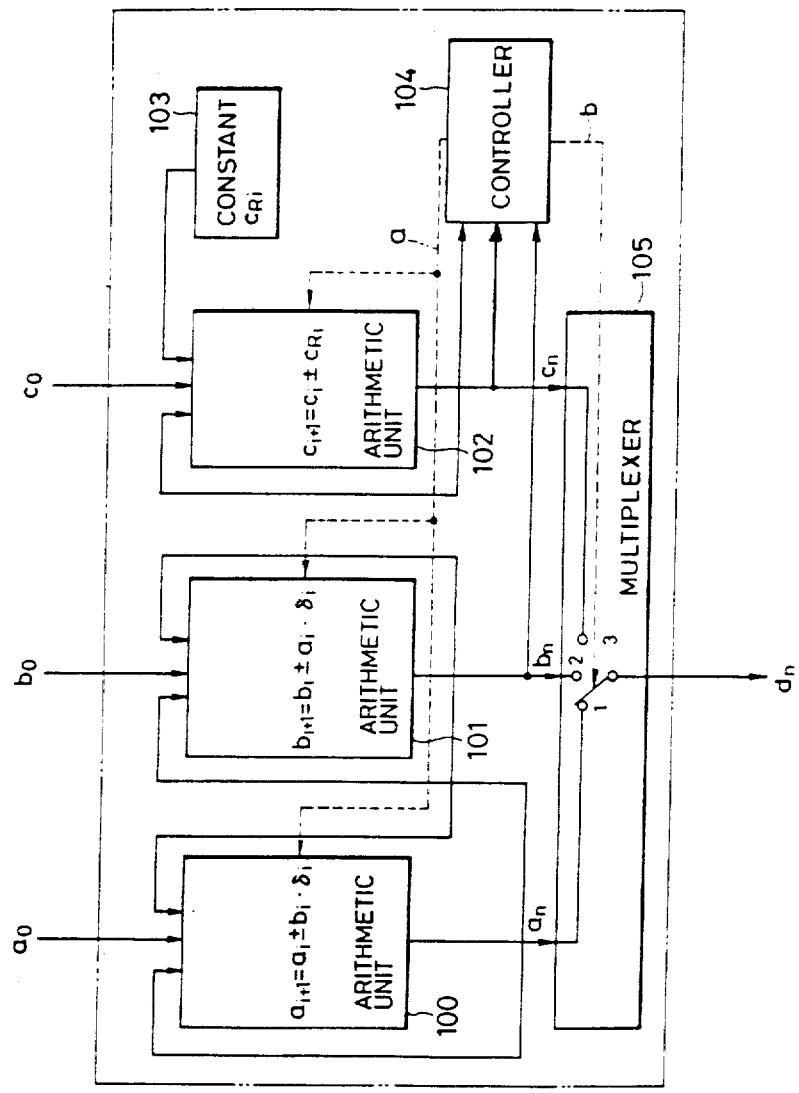
Figure 4:
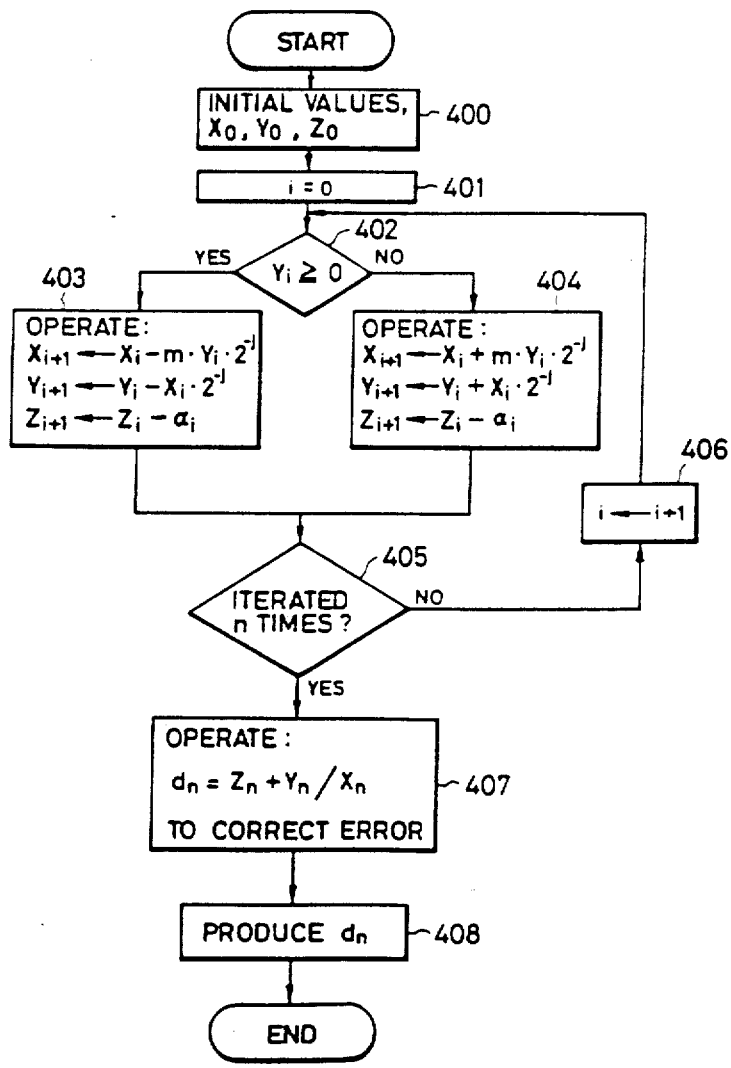
Figure 5:
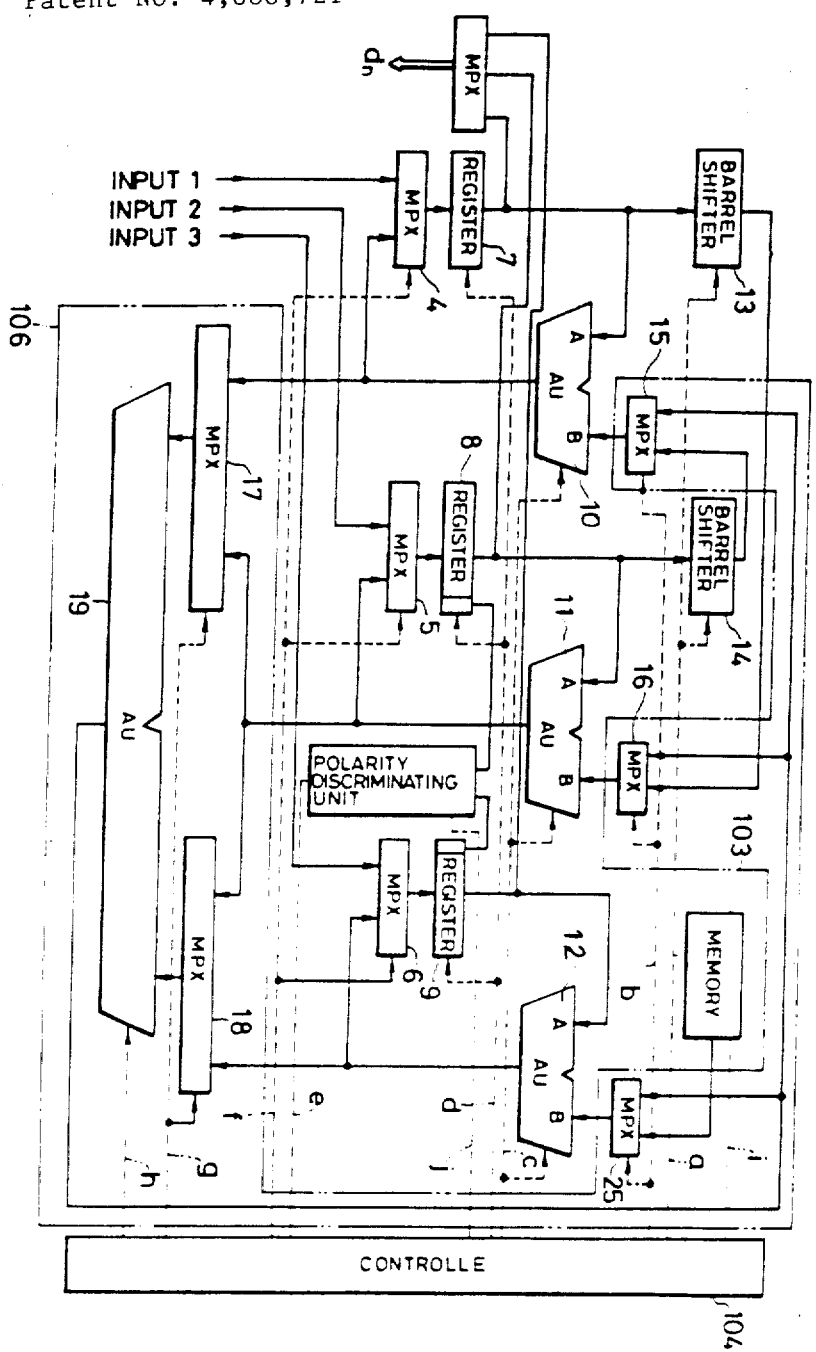

FIG. 9 is a block diagram of the floating-point calculation coprocessor (FPU) 801.

Reference numeral 900 denotes a bus control unit (BCU) which executes the coprocessor interface at a high speed. The input and output signals connected to the BCU 900 are CLK, D31 to D0, $\overline{CS}$, $\overline{AS}$, $\overline{DS}$, R/$\overline{W}$, $\overline{DC}$, $\overline{CDE}$, CPST2 or CPST0, AT3 to AT0, A2 to A0. Symbol CLK denotes a clock signal which is supplied from an external unit and which establishes a reference for the internal operation of the floating-point operation processor. Symbols D31 to D0 denote data signals. Symbol $\overline{CS}$ denotes a chip select signal for selecting the FPU 801. Symbol $\overline{AS}$ denotes an address strobe input signal which indicates the presence of an address signal on the address bus 804. Symbol $\overline{DS}$ denotes a data strobe input signal which indicates the presence of a data signal on the data bus 805. Symbol R/$\overline{W}$ denotes an input signal which indicates the direction of data transfer. When the CPU reads the external memory, the signal R/$\overline{W}$ assumes the level "1" and when the CPU writes the data, the signal R/$\overline{W}$ assumes the level "0". Symbol $\overline{DC}$ denotes a signal which indicates the completion of data transfer on the data bus 805.

Symbol $\overline{CDE}$ denotes a coprocessor data enable signal. When a clock cycle has passed under the condition where the signal $\overline{CDE}$ is asserted, the FPU 801 sends a destination operand onto the data bus 805. CPST2 to CPST0 are signals which represent the internal operation condition of the FPU 801. Further, AT2 to AT0 are signals that indicate the kinds of accesses produced from the CPU 800.

The FPU 801 operates upon receipt of AT2 to AT0 from the CPU 800 and sends CPST2 to CPST0 back to the CPU 800 in order to execute the coprocessor protocol.

Reference numeral 901 denotes a format conversion unit (FCU) which converts single precision data, double precision data and extended double precision data that are described in an external form into data of an internal form (extended double precision type). The input and output data to the FCU 901 are handed over via the BCU 900 and a conversion data bus 806.

Reference numeral 902 denotes an arithmetic unit (EU) which carries out the floating-point operation. The EU 902 receives the converted data of the internal form (extended double precision) from the FCU 901 via an operation data bus 907 and receives commands via an instruction bus 908. In order for the EU 902 to internally execute floating-point operation, including elementary function operation, using the above commands and data, it includes a microprogram storage unit and instruction sequences required for executing the processing flows shown in FIGS. 3 and 4, and a register, MPX, barrel shifter, ALU, memory, and polarity decision unit, shown in FIGS. 5 and 6.

Finding the elementary function according to the present invention will be described next.

Relationhip between a value of the elementary function and error

First, considered below is a relationship between the values of elementary functions and error in the case when the values obtained through n iterative operations of the equation (1.1) are denoted by $X_n$, $Y_n$ and $Z_n$.

2. When $Z_{i+1}$ is to be converged into zero.

If the value of $Z_{i+1}$ after n iterations is denoted by Ze, then the equation (1.1) can be written as follows:

$$\begin{aligned} X_n &= K\{X_0\cos(\sqrt{m}\ \alpha) + Y_0\sin(\sqrt{m}\ \alpha)\} \\ Y_n &= K\{Y_0\cos(\sqrt{m}\ \alpha) - X_0\sin(\sqrt{m}\ \alpha)\} \\ Z_n &= Z_0 + \alpha = Ze \end{aligned} \quad (3)$$

Therefore, $\alpha = Ze - Z_0$. If this is substituted in equation (3) and if this equation is rearranged, then there is obtained, $$\begin{aligned} X_n &= K\Big[\cos(\sqrt{m}\ Z_0)\{X_0\cos(\sqrt{m}\ Ze) + Y_0\sqrt{m}\sin(\sqrt{m}\cdot Ze)\} - \\ &\quad \sqrt{m}\sin(\sqrt{m}\ Z_0)\Big\{Y_0\cos(\sqrt{m}\ Ze) - X_0\frac{1}{\sqrt{m}}\sin(\sqrt{m}\ Ze)\Big\}\Big] \\ Y_n &= K\Big[\cos(\sqrt{m}\ Z_0)\Big\{Y_0\cos(\sqrt{m}\ Ze) - X_0\frac{1}{\sqrt{m}}\sin(\sqrt{m}\ Ze)\Big\} + \\ &\quad \frac{1}{\sqrt{m}}\sin(\sqrt{m}\ Z_0)\{X_0\cos(\sqrt{m}\ Ze) + Y_0\sqrt{m}\sin(\sqrt{m}\ Ze)\}\Big] \end{aligned} \quad (4)$$

Here, if Ze is close to zero, then $m\sqrt{m}\sin(\sqrt{m}\ Ze) = Ze$, and $\cos(\sqrt{m}\ Ze) = 1$. That is, these equations are substituted for the equation (4) which is then rearranged to obtain the following equation (5), $$\begin{aligned} X_n &= K\{\cos(\sqrt{m}\ Z_0)(X_0 - m\cdot Y_0\cdot Ze) - \\ &\quad \sqrt{m}\sin(\sqrt{m}\ Z_0)(Y_0 - X_0\cdot Ze)\} \\ Y_n &= K\Big\{\cos(\sqrt{m}\ Z_0)(Y_0 - X_0\cdot Ze) + \\ &\quad \frac{1}{\sqrt{m}}\sin(\sqrt{m}\ Z_0)(X_0 - m\cdot Y_0\cdot Z_0)\Big\} \end{aligned} \quad (5)$$

In equation (5), if $X_0 = 1/K$, $Y_0 = 0$ and $Z_0 = \omega$ are given as initial values from before the iteration and are substituted, we to obtain the following equation (6), $$\left. \begin{array}{l} \cos(\sqrt{m}\ \omega) = (X_n - m \cdot Y_n \cdot Z_e)/ \\ \quad (1 + m \cdot Z_e^2) \\ m\sqrt{m}\ \sin(\sqrt{m}\ \omega) = (Y_n + X_n \cdot Z_e)/ \\ \quad (1 + m \cdot Z_e^2) \end{array} \right\} \quad (6)$$

In equation (6), $Z_e^2 < < 1$; i.e., $Z_e^2$ is neglected. Furthermore, since $Z_e = Z_n$, equation (7) is obtained from the equation (6), $$\left. \begin{array}{l} \cos(\sqrt{m}\ \omega) = X_n - m \cdot Y_n \cdot Z_n \\ m\sqrt{m}\ \sin(\sqrt{m}\ \omega) = Y_n + X_n \cdot Z_n \end{array} \right\} \quad (7)$$

Equation (7) establishes a relationship relative to the error to be found, and the underlined portions constitute error correction equations.

2. When $Y_{i+1}$ is to be converged into zero.

If the angle subtended by $X_i$, $Y_i$ and X-axis is denoted by $A_i$, then $A_{i+1} = A_i - \alpha_i$ and the following equation (8) is obtained after n iterations, $$\left. \begin{array}{l} A_n = A_o - \alpha \\ A_o = \dfrac{1}{\sqrt{m}}\ \tan^{-1}\left(\dfrac{\sqrt{m}\ Y_o}{X_o}\right) \end{array} \right\} \quad (8)$$

If the value $Y_n$ after n times of iteration is denoted by $Y_e$, then $A_n$ is given as, $$A_n = \dfrac{1}{\sqrt{m}}\ \tan^{-1}\left(\dfrac{\sqrt{m}\ Y_e}{X_o}\right)$$

If this equation is substituted in equation (8), the following equation (9) is obtained, $$\alpha = A_o - A_n = \dfrac{1}{\sqrt{m}}\ \tan^{-1}\left(\dfrac{\sqrt{m}\ Y_o}{X_o}\right) - \dfrac{1}{\sqrt{m}}\ \tan^{-1}\left(\dfrac{\sqrt{m}\ Y_e}{X_n}\right) \quad (9)$$

In equation (9), $$\dfrac{1}{\sqrt{m}}\ \tan^{-1}\left(\dfrac{\sqrt{m}\ Y_e}{X_n}\right) = \dfrac{Y_e}{X_n}$$

if $Y_e$ is close to 0.

If this equation is substituted in equation (9), therefore, the following equation (10) is obtained, $$\alpha = \dfrac{1}{\sqrt{m}}\ \tan^{-1}\left(\dfrac{\sqrt{m}\ Y_o}{X_o}\right) - \dfrac{Y_e}{X_n} \quad (10)$$

Here, equation (10) is substituted in equation (1.3), and initial values, i.e., $X_0 = 1$, $Y_0 = \omega$ and $Z_0 = 0$ are substituted and the equation is rearranged to obtain the following equation, $$\dfrac{1}{\sqrt{m}}\ \tan^{-1}(\sqrt{m}\ \omega) = Z_n + Y_e/X_n$$

Here, since $Y_e = Y_n$, the above equation is written as follows:

$$\dfrac{1}{\sqrt{m}}\ \tan^{-1}(\sqrt{m}\ \omega) = Z_n + Y_n/X_n \quad (11)$$

The above equation establishes a relationship relative to the error that is to be found, and the underlined portion constitutes an error correction equation.

Thus, the elementary function to be found by converging $Z_{i+1}$ to zero was subjected to one time of multiplication and addition and subtraction as given by the equation (7), and the elementary function to be found by converging $Y_{i+1}$ into zero was subjected to one time of division and addition as given by the equation (11), in order to derive a method of correcting error. The flow chart of FIG. 3 explains the error correction method of the former case when $Z_{i+1}$ is converged into zero, and the flow chart of FIG. 4 explains the error correction method of the latter case of when $Y_{i+1}$ is converged into zero.

Figure 3:
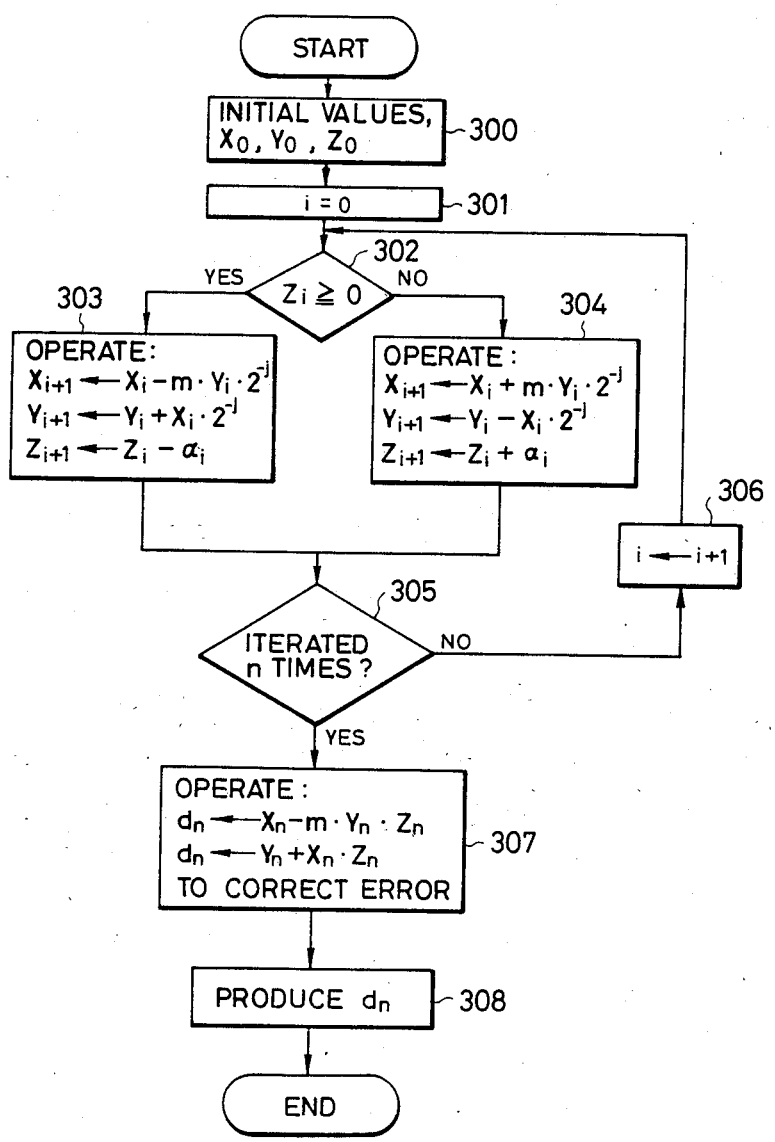
FIGS. 3 and 4 are flow charts of error correction processing according to the present invention.

In FIG. 3, the initial values $X_0$, $Y_0$ and $Z_0$ are set (step 300), i=0 is set (step 301), the polarity ± of $Z_i$ is determined (step 302), and operation of the following equation is executed, depending upon the polarity.

(1) When $Z_i \geq 0$ (step 303):

$$\left\{ \begin{array}{l} X_{i+1} \leftarrow X_i - m \cdot Y_i \cdot 2^{-j} \\ (j = i \text{ when } m = 1 \text{ and } j = i + 1 \text{ when } m = -1) \\ Y_{i+1} \leftarrow Y_i - X_i \cdot 2^{-j} \\ Z_{i+1} \leftarrow Z_i - \alpha_i \end{array} \right.$$

(2) When $Z_i < 0$ (step 304):

$$\left\{ \begin{array}{l} X_{i+1} \leftarrow X_i + m \cdot Y_i \cdot 2^{-j} \\ Y_{i+1} \leftarrow Y_i - X_i \cdot 2^{-j} \\ Z_{i+1} \leftarrow Z_i + \alpha_i \end{array} \right.$$

where m is 1 in the case of a trigonometric function and −1 in the case of a hyperbolic function.

Next, the number of iterations is checked (step 305). When a specified number of times has not been reached, i is replaced by i+1, and the program returns to the step of determining the polarity of $Z_i$ (step 306). When the specified number of times is reached, the error correction operation is executed in compliance with the following equation (step 307):

(1) When the elementary function value is to be found for $$X_n: d_n = X_n - m \cdot Y_n \cdot Z_n$$

(2) When the elementary function value is to be found for $Y_n$: $d_n = Y_n + X_n \cdot Z_n$ The elementary function value containing little error is obtained for the value $d_n$ whose error has been corrected, thereby to produce $d_n$ (step 308).

Figure 4:
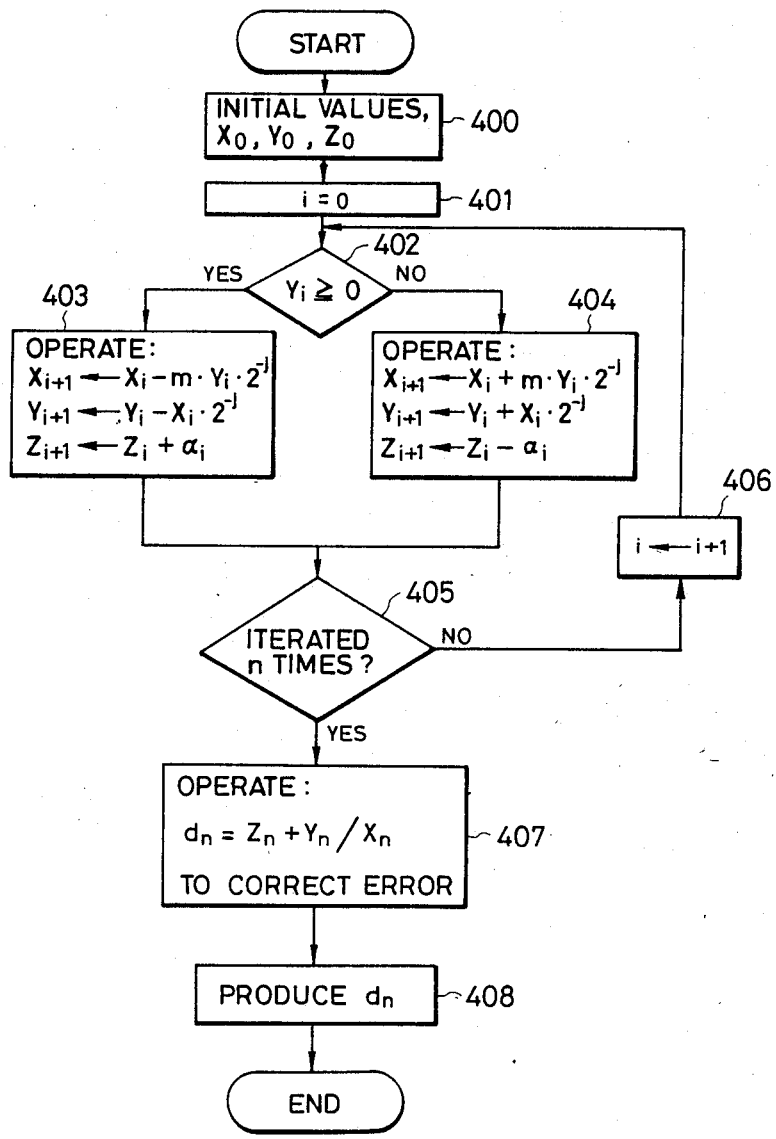

In FIG. 4, the initial values $X_0$, $Y_0$ and $Z_0$ are set (step 400), and $i=0$ is set (step 401). Then, the polarity $\pm$ of $Y_i$ is determined (step 402), and the operation of the following equation is executed, depending upon the polarity:

(1) When $Y_i \geq 0$ (step 403):

$$\begin{cases} X_{i+1} \leftarrow X_i + m \cdot Y_i \cdot 2^{-j} \\ Y_{i+1} \leftarrow Y_i - X_i \cdot 2^{-j} \\ Z_{i+1} \leftarrow Z_i + \alpha_i \end{cases}$$

(2) When $Y_i < 0$ (step 404):

$$\begin{cases} X_{i+1} \leftarrow X_i + m \cdot Y_i \cdot 2^{-j} \\ Y_{i+1} \leftarrow Y_i - X_i \cdot 2^{-j} \\ Z_{i+1} \leftarrow Z_i + \alpha_i \end{cases}$$

where m is 1 in the case of a trigonometric function and $-1$ in the case of a hyperbolic function.

Next, the number of iterations is checked (step 405). When a specified number of times has not been reached, i is replaced by $i+1$, and the program returns to the step of determined the polarity of $Z_i$ (step 406). When the specified number of times is reached, the error correction operation is executed in compliance with the following equation (step 407):

$$d_n = Z_n + Y_n / X_n$$

The elementary function value containing little error is obtained for the value $d_n$ whose error has been corrected, thereby to produce $d_n$ (step 408).

Constitution of the elementary function arithmetic unit

Figure 1:
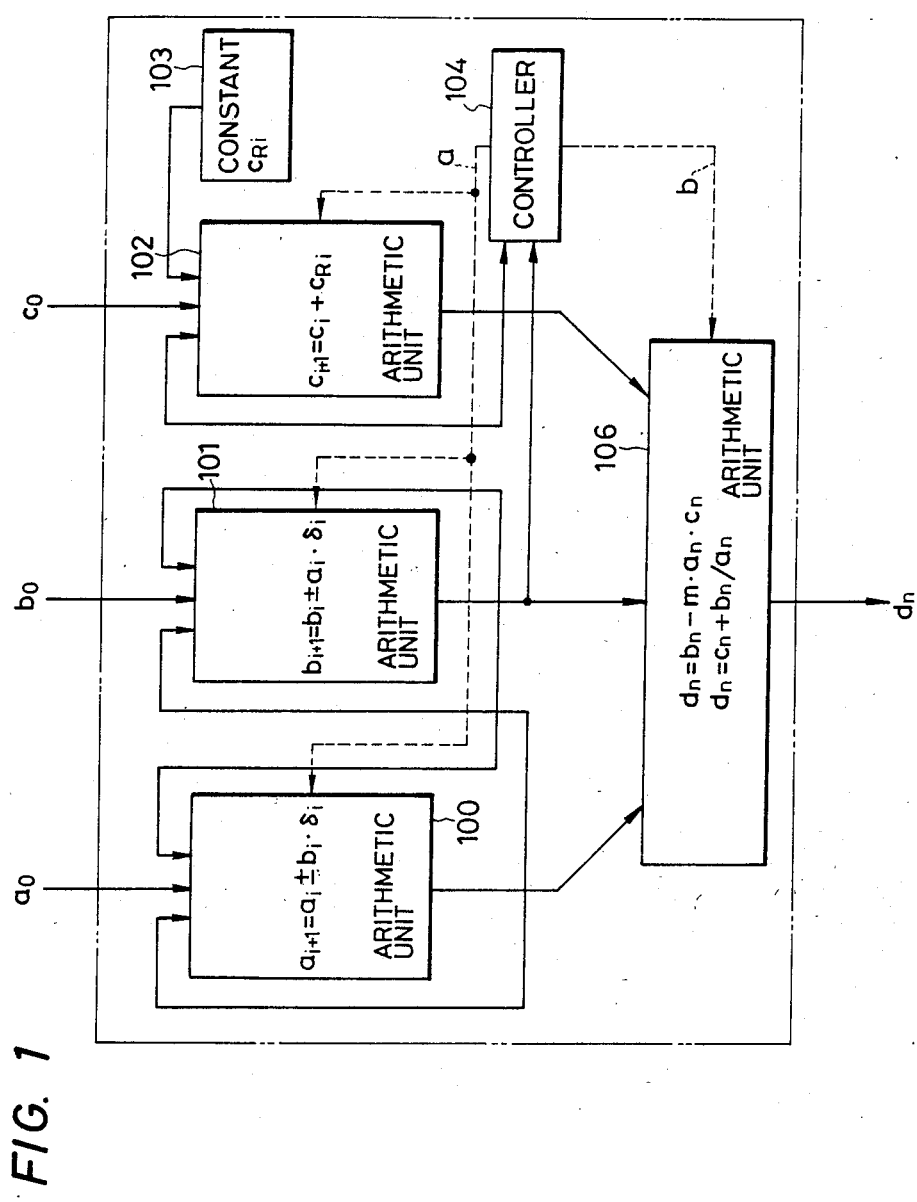
FIG. 1 is a block diagram which illustrates an embodiment of the present invention.
Figure 2:
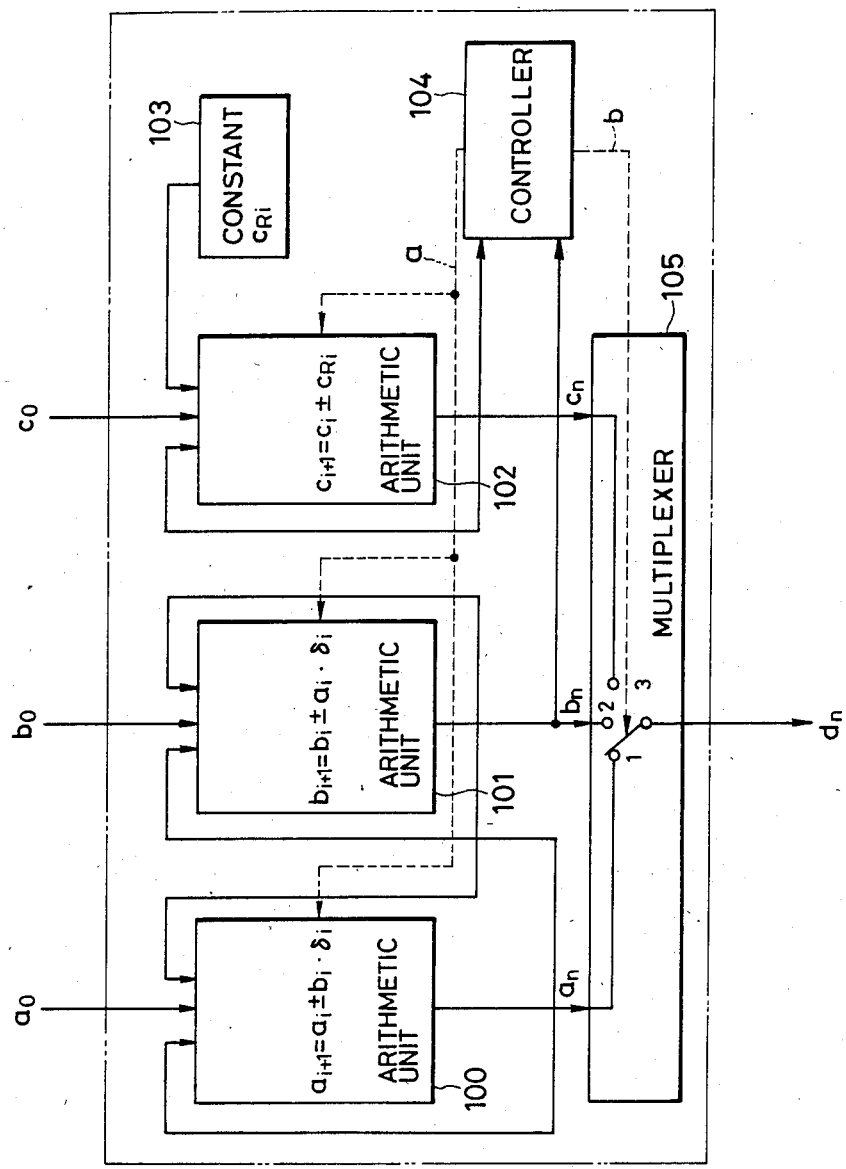
FIG. 2 is a block diagram of a conventional elementary function arithmetic unit.

FIG. 1 illustrates an elementary function arithmetic unit which employs the above-mentioned error correction system.

In FIG. 1, three initial values $a_0$, $b_0$ and $c_0$, consisting of an argument of an elementary function to be found and two constants determined depending upon the elementary functions, are input. Arithmetic units 100, 101 and 102, that have received the initial values, then perform the iterative operation n times successively based upon the relationships $a_{i+1} = a_i \pm b_i \cdot \delta_i$, $b_{i+1} = b_i \pm a_i \cdot \delta_i$, and $c_{i+1} = c_i \pm cR_i$, respectively, where $\delta_i$ is a given variation. Symbol $cR_i$ denotes a constant which is determined depending upon the number of iterations and which is stored in the memory 103 in advance.

In the step of iteration, the value $b_i$ or $c_i$ is input to the controller 104 which, upon receipt of a control signal a, controls whether the $i+1$-th operation of the arithmetic unit be the addition or the subtraction depending upon the elementary function to be found. After n times of iterations, the three values $a_n$, $b_n$ and $c_n$ are used to execute either one of the operations, $$d_n = b_n - m \cdot a_n \cdot c_n$$

$$d_n = c_n + b_n / a_n$$

by the arithmetic unit 106 that is controlled by a control signal b which selects the error correction system depending upon the elementary function. Thereafter, the elementary function value $d_n$ containing little error is produced.

Circuit of the Elementary function arithmetic unit

Described below is an embodiment of a binary elementary function arithmetic unit for the case when the aforementioned elementary function arithmetic unit is provided in a binary form.

Figure 5:
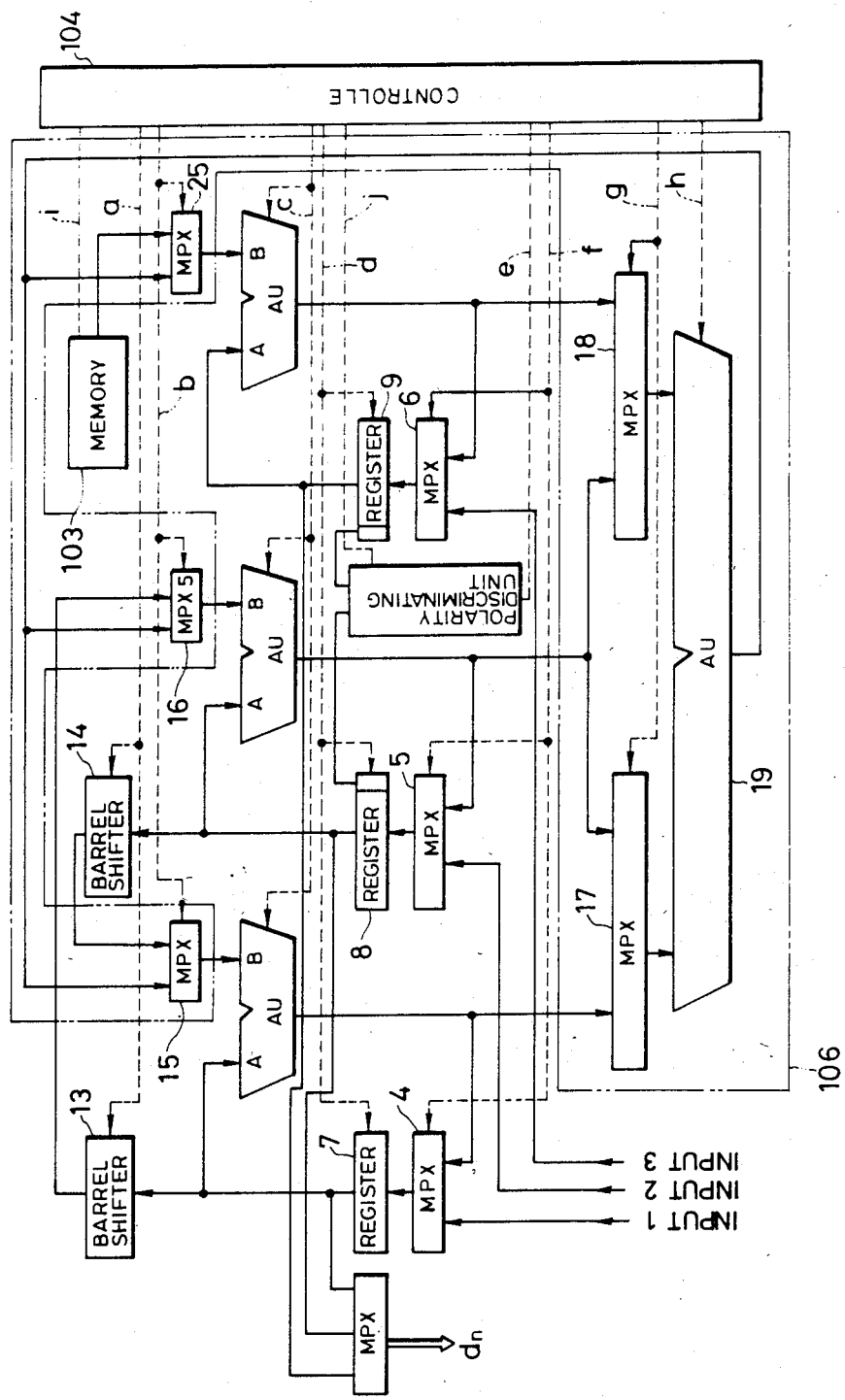
FIG. 5 is a circuit diagram which concretely illustrates an elementary function arithmetic unit of a concurrently processing system according to the present invention.
Figure 6:
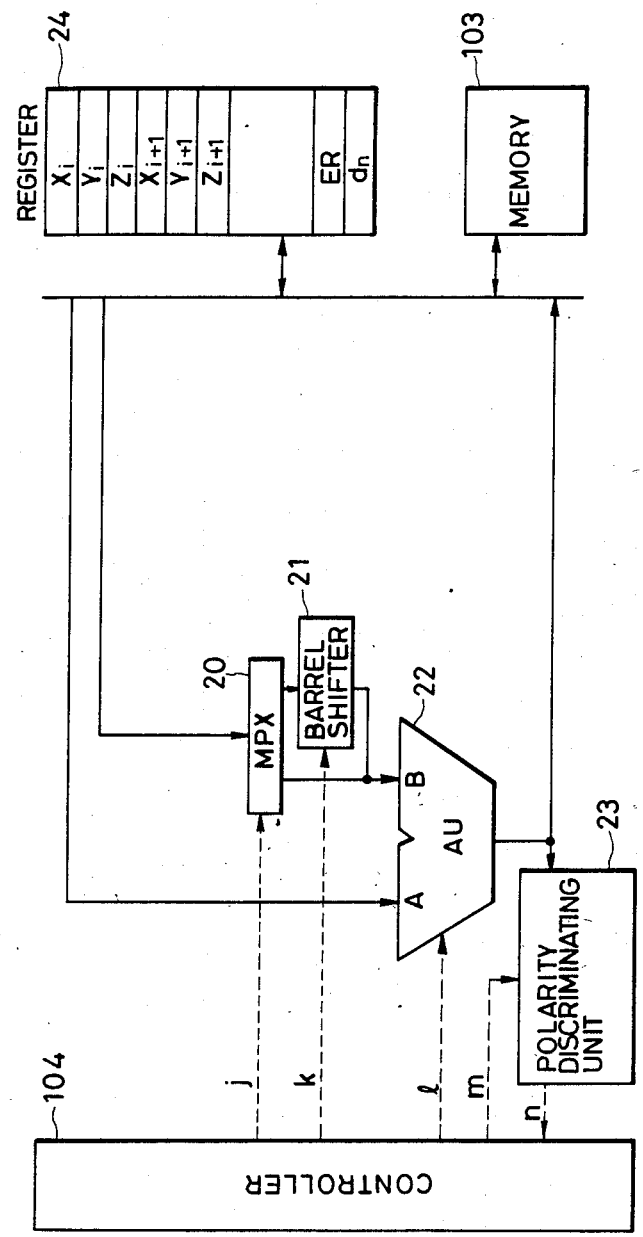
FIG. 6 is a circuit diagram which concretely illustrates an elementary function arithmetic unit of a serially processing system according to the present invention.

FIG. 5 illustrates an embodiment in which the arithmetic operation is processed concurrently using four arithmetic units to increase the operation speed, and FIG. 6 illustrates an embodiment in which the arithmetic operation is successively processed using a single arithmetic unit to reduce the size of the unit.

In FIG. 5, a portion 106, surrounded by a two-dot chain line, is an error correction arithmetic unit for correcting errors according to the present invention. The initial values are input through input terminals 1, 2 and 3. Multiplexers MPX4, MPX5 and MPX6 are controlled by a control signal f from a controller 104, and set the initial values in registers 7, 8 and 9, respectively. Outputs of the registers 7, 8 and 9 are input to one of the two inputs of each arithmetic unit, i.e., input to the input terminals of the side A of arithmetic units AU10, AU11 and AU12. Outputs of the registers 7 and 8 are controlled by the controller 104 in response to the control signal a, and are input to barrel shifters 13 and 14 that effect the shift of a given bit number. The barrel shifters 13 and 14 barrel-shift the input values depending upon the number of iterations. Outputs of the barrel-shifted barrel shifters 13 and 14 are selected by MPX15 and MPX16 which are controlled by the control signal b from the controller 104. The output of the barrel shifter 13 is input to side B of AU11, and the output of the barrel shifter 14 is input to side B of AU10. The output e of the polarity discriminating unit which is controlled by a control signal j so as to determine the polarity of the register 8 or the register 9 depending upon the function, is converted through the controller 104. AU10, AU11 and AU12 are controlled by a control signal c; i.e., AU10, AU11 and AU12 perform addition and subtraction. AU12 receives on the side B thereof the output of the register 9 and the data of a memory 103 controlled by a control signal i, via an MPX25 that is controlled by the control signal b. When the number of iterations is not greater than a specified value, outputs of the AU10, AU11 and AU12 are set to the registers 7, 8 and 9, respectively via MPX4, MPX5 and MPX6. The iterative calculation of the aforementioned equation (1.1) is thus executed. After n times of iterations, the values $X_n$, $Y_n$ and $Z_n$ of the equation (1.2) are obtained on the outputs of AU10, AU11 and AU12.

After n times of iterations, outputs of the AU10, AU11 and AU12 are input to the error correction arithmetic unit 106 which corrects error as contemplated by the present invention. Outputs are input in three patterns to the AU19 via MPX17 and MPX18 that are controlled by a control signal g; i.e., to the AU19 are input output of AU10 and output of AU11, output of AU11 and output of AU12, and output of AU10 and output of AU12. AU19, controlled by a control signal h, multiplies or divides the input data by the elementary function to be found. The output is input to the side B of AU10, AU11 or AU12 via any one of MPX15, MPX16 or MPX17, and is added to the values $X_n$, $Y_n$, $Z_n$ stored in the registers 7, 8 and 9. The output is then stored in any one of the registers 7, 8 or 9, and the value thereof is sent to the external side. Owing to the error correction arithmetic unit 106, the value of an elementary function containing small error of the equation (7) or (11) can be found in any one of the register 7, 8 or 9.

In FIG. 6, the initial values ($X_i$, $Y_i$, $Z_i$, i=0) are stored in a register 24. The value $X_i$ is input to the side A of AU22, and the value $Y_i$ is switched to a barrel shifter 21 by an MPX 20 which is controlled by a control signal j from the controller 104. In response to a control signal k from the controller 104, the barrel shifter 21 barrel-shifts the input value depending upon the number i of iterations and inputs the result to the side B of AU22. The AU22 is controlled by a control signal l from the controller 104, and performs the addition and subtraction. The output $X_{i+1}$ of AU22 is stored in the register 24. The value $Y_i$ is input to the side A of AU22, the value $X_i$ is input to the side B of AU22 via MPX20 and barrel shifter 21, and the output of AU22 is stored as $Y_{i+1}$ in the register 24. The control operation is carried out by control signals j, k and l from the controller 104. Next, the value $Z_i$ is input to the side A of AU22, and to the side B thereof is input a constant that is determined depending upon the number of iteration read from a memory 103 via the MPX20 which is controlled by the control signal j. The AU22 performs the addition and subtraction relying upon a control signal l, and its output $Z_{i+1}$ is stored in the register 24. The above-mentioned series of operations is repeated n times. In the iterative step, either the value $Y_{i+1}$ or the value $Z_{i+1}$ is input to a polarity determining unit 23 in response to a control signal m from the controller 104, depending upon the elementary function to be found. The polarity determining unit 23 determines whether the input value is positive or negative. The determination signal n is then input to the controller 104 which produces a control signal l for either addition or subtraction in the next iteration.

After n iterations, the values $X_n$, $Y_n$, $Z_n$ are left in the register 24. The controller 104 then executes the arithmetic operation $X_n \cdot Z_n$ or $Y_n \cdot Z_n$ or $Y_n/X_n$ in the form of successive processing of addition or subtraction using the AU22, and stores the value ER in the register 24. The AU22 then performs the addition or subtraction relative to any one of $X_n$, $Y_n$ or $Z_n$ in the register 24, stores the output $d_n$ in the register 24, and sends the value thereof to the external side.

The elementary function value containing little error of the equation (7) or (11) is thus found on the value $d_n$ in the register 24.

Figure 7:
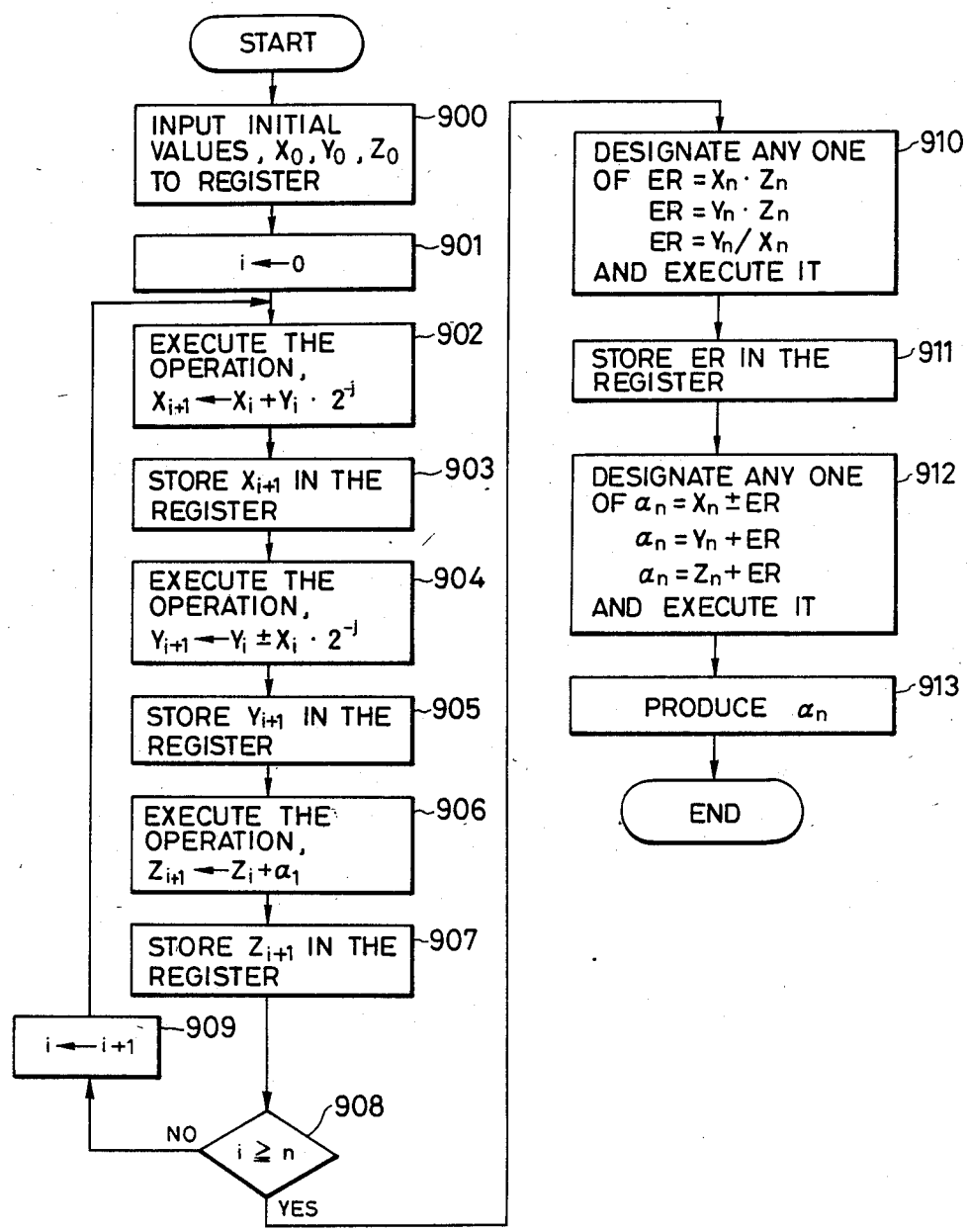
FIG. 7 is a flow chart illustrating the operation of the case of FIG. 6.

FIG. 7 is a flow chart which illustrates the contents for controlling the controller 104 of FIG. 6. In FIG. 7, the controller 104 inputs $X_0$, $Y_0$ and $Z_0$ to the registers 24 (step 900) and sets i=0 (step 901). Then, the operation $X_{i+1} \leftarrow X_i \pm Y_i \cdot 2^{-j}$ is executed by the arithmetic unit of FIG. 6, and the result $X_{i+1}$ is stored in the registers 24 (steps 902 and 903).

Similarly, the operations $Y_{i+1} \leftarrow Y_i \pm X_i \cdot 2^{-j}$ and $Z_{i+1} \leftarrow Z_i \pm \alpha_i$ are executed and stored in the registers 24 (steps 904 to 907). Then, the number of iterations is checked (step 908). When the specified number of iterations has not been reached, i is replaced by i+1 (step 909) and the operation is repeated until the specified number n is reached. When the specified number is reached, any one of the operations $ER = X_n \cdot Z_n$, $ER = Y_n \cdot Z_n$, or $ER = Y_n/X_n$ is designated and is executed by the arithmetic unit, and the result ER is stored in the register 24 (step 910, 911). Then, using the value stored in the register 24, any one of the following operation, i.e., $$d_n = X_n \pm ER$$

$$d_n = Y_n \pm ER$$

$$d_n = Z_n \pm ER$$

is designated and is executed by the arithmetic unit of FIG. 6 (step 912).

As a result of execution, $d_n$ is produced as an elementary function value (step 913).

According to the present invention, the elementary functions can be found maintaining precision even through a relatively small number of is performed by correcting error. Further, when it is required to obtain precision same as the precision of when the error is not corrected, the iteration may be ceased before the specified number of iterations is reached, and the error correction equations (7) and (11) are executed to increase the operation speed. Further, the constants to be stored in the memory are reduced depending upon the number of iterations, in order to reduce the required memory capacity.

What is claimed is:

1. An elementary function arithmetic unit comprising:
   a constant memory for storing a constant that corresponds to the number of successive iterative operations;
   a controller for causing addition or subtraction in the successive iterative operations;
   arithmetic units for receiving, as initial values, an argument of an elementary function value to be found and two constants dependent upon the elementary functions to be found, and subjecting these initial value to n iterative operations to produce elementary function values; and
   a further arithmetic unit for subjecting the elementary function values produced by the n iterative operations by said arithmetic units to multiplication, addition, subtraction, or division, or a combination thereof, thereby to produce the thus obtained value.

2. A microprocessor integrated on a single semiconductor substrate comprising:
   a microprogram memory for storing a microprogram that includes an execution instruction for at least an elementary operation;
   a constant memory for storing a constant that corresponds to the number of successive iterative operations based upon the stored microprogram;
   a controller for causing addition or subtraction in the successive iterative operations; and
   arithmetic units for receiving, as initial values, an argument of an elementary function value to be found and two constants dependent upon the elementary functions to be found, subjecting these initial values to n iterative operations, and then subjecting the thus obtained values to multiplication, addition, subtraction, or division, or a combination thereof, thereby to produce the thus obtained value.

3. An elementary function arithmetic system comprising:
- a first memory means for storing a macro instruction for a desired elementary function operation;
- a second memory means for storing argument data of the floating-point type;
- a first microprocessor for decoding a macro instruction of said elementary function operation and producing the operation; and
- a second microprocessor which includes:
- a microprogram memory for storing a microprogram that includes an execution instruction for the elemetry operation in response to an output signal n of said first microprocessor;
- a constant memory for storing a constant that corresponds to the number of successive iterative operations based upon the stored microprogram;
- a controller for causing addition or subtraction in the successive iterative operations; and
- arithmetic units for receiving, as initial values, an argument of an elementary function value to be found and two constants determined depending upon the elementary functions to be found, subjecting these initial values to n iterative operations, and then subjecting the thus obtained values to multiplication, addition, subtraction, or division, or a combination thereof, thereby to produce the thus obtained value.

* * * * *

UNITED STATES PATENT AND TRADEMARK OFFICE
CERTIFICATE OF CORRECTION

PATENT NO. : 4,888,721

DATED : December 19, 1989

INVENTOR(S) : Eiki KONDOH, et al.

It is certified that error appears in the above-identified patent and that said Letters Patent is hereby corrected as shown below:

Column 8, line 40, change "$Y_{i+1} \leftarrow Y_i - X_i \cdot 2^{-j}$" to
--$Y_{i+1} \leftarrow Y_i + X_i \cdot 2^{-j}$--

Column 10, line 48, change "the register 9" to
-- AU19 --

In the drawings, cancel Figures 1, 2, 4, and 5 and substitute the attached Figures 1, 2, 4, and 5, respectively.

Signed and Sealed this

Sixteenth Day of July, 1991

Attest:

HARRY F. MANBECK, JR.

Attesting Officer

Commissioner of Patents and Trademarks